United States Patent
Lim et al.

(10) Patent No.: US 10,298,304 B2
(45) Date of Patent: May 21, 2019

(54) SOUNDING METHOD FOR BEAMFORMING TRANSMISSION IN WIRELESS LAN SYSTEM AND APPARATUS THEREFOR

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Hangyu Cho, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 15/259,519

(22) Filed: Sep. 8, 2016

(65) Prior Publication Data

US 2017/0070274 A1    Mar. 9, 2017

Related U.S. Application Data

(60) Provisional application No. 62/215,756, filed on Sep. 9, 2015, provisional application No. 62/243,639, filed on Oct. 19, 2015.

(51) Int. Cl.
*H04W 4/00* (2018.01)
*H04B 7/06* (2006.01)
(Continued)

(52) U.S. Cl.
CPC .......... *H04B 7/0617* (2013.01); *H04B 7/066* (2013.01); *H04B 7/0619* (2013.01); *H04L 25/0224* (2013.01); *H04W 84/12* (2013.01)

(58) Field of Classification Search
CPC .... H04B 7/0617; H04B 7/0619; H04B 7/066; H04L 25/0224; H04W 84/12
(Continued)

(56) References Cited

U.S. PATENT DOCUMENTS 9,397,873 B2 * 7/2016 Zhang ................... H04L 1/0057
2012/0033592 A1 * 2/2012 Kim ..................... H04B 7/0452
370/310
(Continued)

FOREIGN PATENT DOCUMENTS

| WO | 2012058327 | 5/2012 |
| WO | 2013077688 | 5/2013 |
| WO | 2015068968 | 5/2015 |

OTHER PUBLICATIONS

Pang, et al., "Performance evaluation of SU/MU-MIMO in OFDMA", doc.: IEEE 802.11-15/0832r0, Jul. 2015, 17 pages.
(Continued)

*Primary Examiner* — Sai Ming Chan
(74) *Attorney, Agent, or Firm* — Lee Hong Degerman Kang Waimey

(57) ABSTRACT

When an AP (access point) performs sounding to transmit a frame to one or more STAs using a beamforming scheme in a wireless LAN (WLAN) system, the AP receives a beamforming feedback, which is generated based on measurement of a specific signal transmitted by the AP in a manner that the one or more STAs group a prescribed number of tones according to a tone grouping element (Ng). In this case, the Ng is configured by a multiple of 4.

15 Claims, 12 Drawing Sheets

(51) Int. Cl.
*H04L 25/02* (2006.01)
*H04W 84/12* (2009.01)

(58) Field of Classification Search
USPC .......................................................... 370/338
See application file for complete search history.

(56) References Cited

U.S. PATENT DOCUMENTS

| | | | |
|---|---|---|---|
| 2012/0250543 A1* | 10/2012 | Abraham | H04B 7/0626 370/252 |
| 2014/0126398 A1 | 5/2014 | Kim et al. | |
| 2014/0301240 A1 | 10/2014 | Park et al. | |
| 2014/0348097 A1 | 11/2014 | Park et al. | |
| 2016/0044533 A1* | 2/2016 | Seok | H04L 5/0007 370/330 |
| 2016/0204960 A1* | 7/2016 | Yu | H04L 25/0202 370/338 |
| 2016/0254884 A1* | 9/2016 | Hedayat | H04B 7/0413 370/329 |

OTHER PUBLICATIONS

PCT International Application No. PCT/KR2016/009905, Written Opinion of the International Searching Authority dated Dec. 6, 2016, 12 pages.

European Patent Office Application Serial No. 161879903, Search Report dated Jan. 20, 2017, 8 pages.

Yang et al., "11ax OFDMA Tone Plan Leftover Tones and Pilot Structure," IEEE 802.11-15/0819r1, XP055334798, Jul. 2015, 32 pages.

\* cited by examiner

SOUNDING METHOD FOR BEAMFORMING TRANSMISSION IN WIRELESS LAN SYSTEM AND APPARATUS THEREFOR

CROSS REFERENCE

Pursuant to U.S.C. § 119(e), this application claims the benefit of U.S. Provisional Application No. 62/215,756, filed on Sep. 9, 2015 and 62/243,639, filed on Oct. 19, 2015, the contents of which are all hereby incorporated by reference herein in their entirety.

BACKGROUND OF THE INVENTION

Technical Field

The present specification relates to a wireless LAN system, more particularly, to a method of efficiently performing sounding for beamforming transmission in a wireless LAN system and an apparatus therefor.

Discussion of the Related Art

A sounding method proposed in the following can be applied to various wireless communication systems. In the following, a WLAN (wireless local area network) system is explained as an example of a system to which the present invention is applicable.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

A radio frame including a 4× structure is going to be used in IEEE 802.11ax standardization to provide higher performance. And, OFDMA transmission is going to be supported to a plurality of users to efficiently use a resource in IEEE 802.11ax standardization.

SUMMARY OF THE INVENTION

Technical Problem

A technical object of the present invention is to provide a method of efficiently performing sounding in accordance with a newly introduced radio frame structure in the aforementioned WLAN system and regulate a method for an STA to feedback on the sounding to an AP.

The present invention is not restricted by the aforementioned technical object and other technical objects can be deducted from embodiments of the present invention.

Technical Solution

To achieve these objects, according to one embodiment of the present invention, a method of performing sounding, which is performed by an AP (access point) to transmit a frame to one or more STAs using a beamforming scheme in a wireless LAN (WLAN) system, includes the steps of transmitting a specific signal, which is transmitted to the one or more STAs by the AP via a plurality of tones belonging to a prescribed range and receiving a beamforming feedback, which is generated based on measurement of the specific signal in a manner that the one or more STAs group a prescribed number of tones according to a tone grouping element (Ng). In this case, the Ng can be configured by a multiple of 4.

If the WLAN system corresponds to a system supporting IEEE 802.11ax scheme, it may be preferable that the Ng has a minimum value greater than a minimum value of Ng used in IEEE 802.11ac scheme as much as 4 times. Specifically, the Ng can be configured by one selected from the group consisting of 4, 8 and 16.

Meanwhile, the step of transmitting the specific signal transmitted by the AP can include the steps of transmitting an NDP-A (non data packet announcement) frame to the one or more STAs by the AP and transmitting an NDP frame including the specific signal to the one or more STAs by the AP.

The AP can inform the one or more STAs of an Ng value to be used by the one or more STAs via the NDP-A frame.

The beamforming feedback can be received in a unit of 26 tones corresponding to an RU (resource unit). In this case, the 26 tones may correspond to a minimum resource unit of OFDMA.

The Ng can be configured by a different value according to a size of a resource region in which the beamforming is performed.

Meanwhile, according to a different embodiment of the present invention, a method of transmitting a beamforming feedback, which is transmitted by an STA in a wireless LAN (WLAN) system, includes the steps of receiving a specific signal from an AP (access point) via a plurality of tones belonging to a prescribed range and transmitting a beamforming feedback, which is generated based on measurement of the specific signal in a manner of grouping a prescribed number of tones according to a tone grouping element (Ng), to the AP. In this case, the Ng can be configured by a multiple of 4.

Meanwhile, according to a further different embodiment of the present invention, An AP (access point) performing sounding to transmit a frame to one or more STAs using a beamforming scheme in a wireless LAN (WLAN) system can include a transceiver configured to transmit a specific signal to the one or more STAs via a plurality of tones belonging to a prescribed range and receive a beamforming feedback from the one or more STAs and a processor configured to process the beamforming feedback received by the transceiver, the processor configured to process the beamforming feedback by assuming that the beamforming feedback is generated based on measurement of the specific signal in a manner that the one or more STAs group a prescribed number of tones according to a tone grouping element (Ng). In this case, the Ng can be configured by a multiple of 4.

Meanwhile, according to a further different embodiment of the present invention, an STA transmitting a beamforming feedback in a wireless LAN (WLAN) system can include a transceiver configured to receive a specific signal from an AP (access point) via a plurality of tones belonging to a prescribed range and transmit a beamforming feedback to the AP and a processor configured to generate the beamforming feedback based on measurement of the specific signal in a manner of grouping a prescribed number of tones according to a tone grouping element (Ng). In this case, the Ng can be configured by a multiple of 4.

Advantageous Effects

By using the above scheme, AP and STA can efficiently perform sounding in accordance with a newly introduced radio frame structure in the aforementioned WLAN system.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

Embodiments of the present invention may be supported by the standard documents disclosed in at least one of wireless access systems including IEEE 802 system, 3GPP system, 3GPP LTE system, 3GPP LTE-A system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

Figure 1:
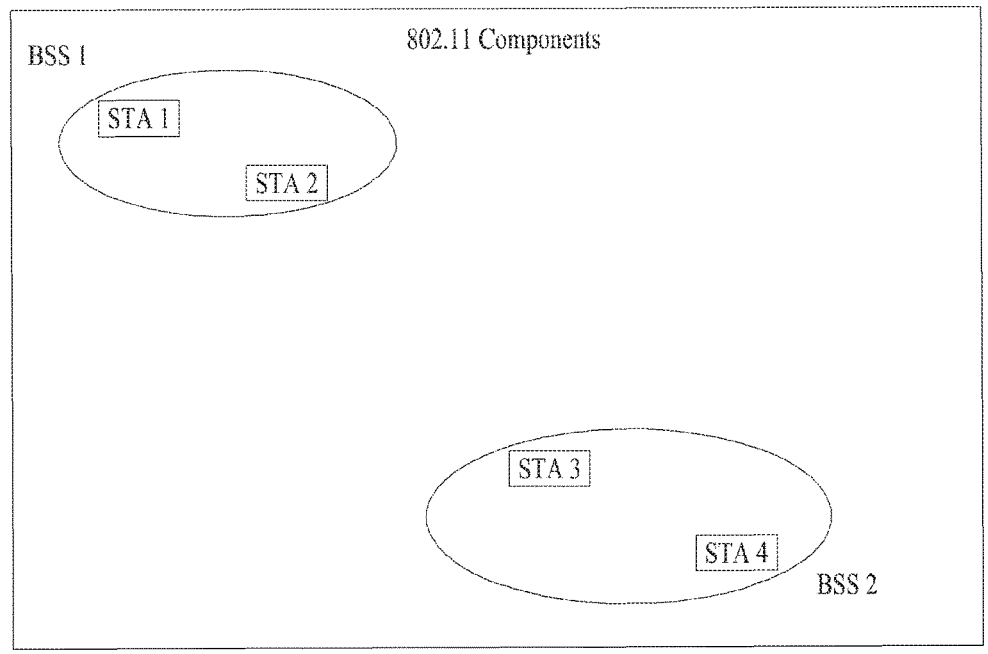
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
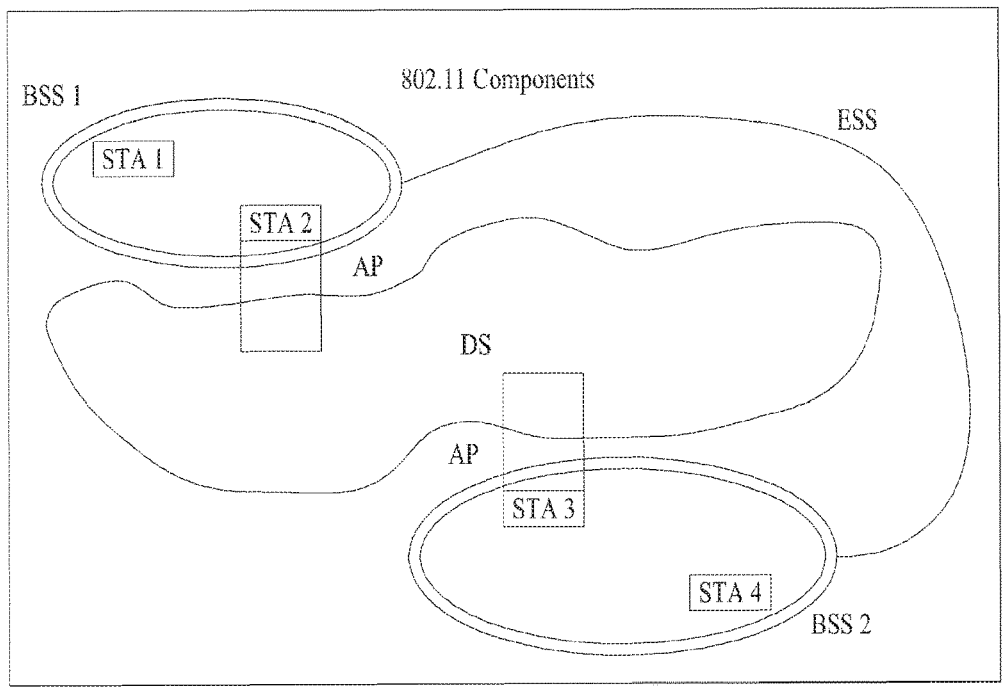
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
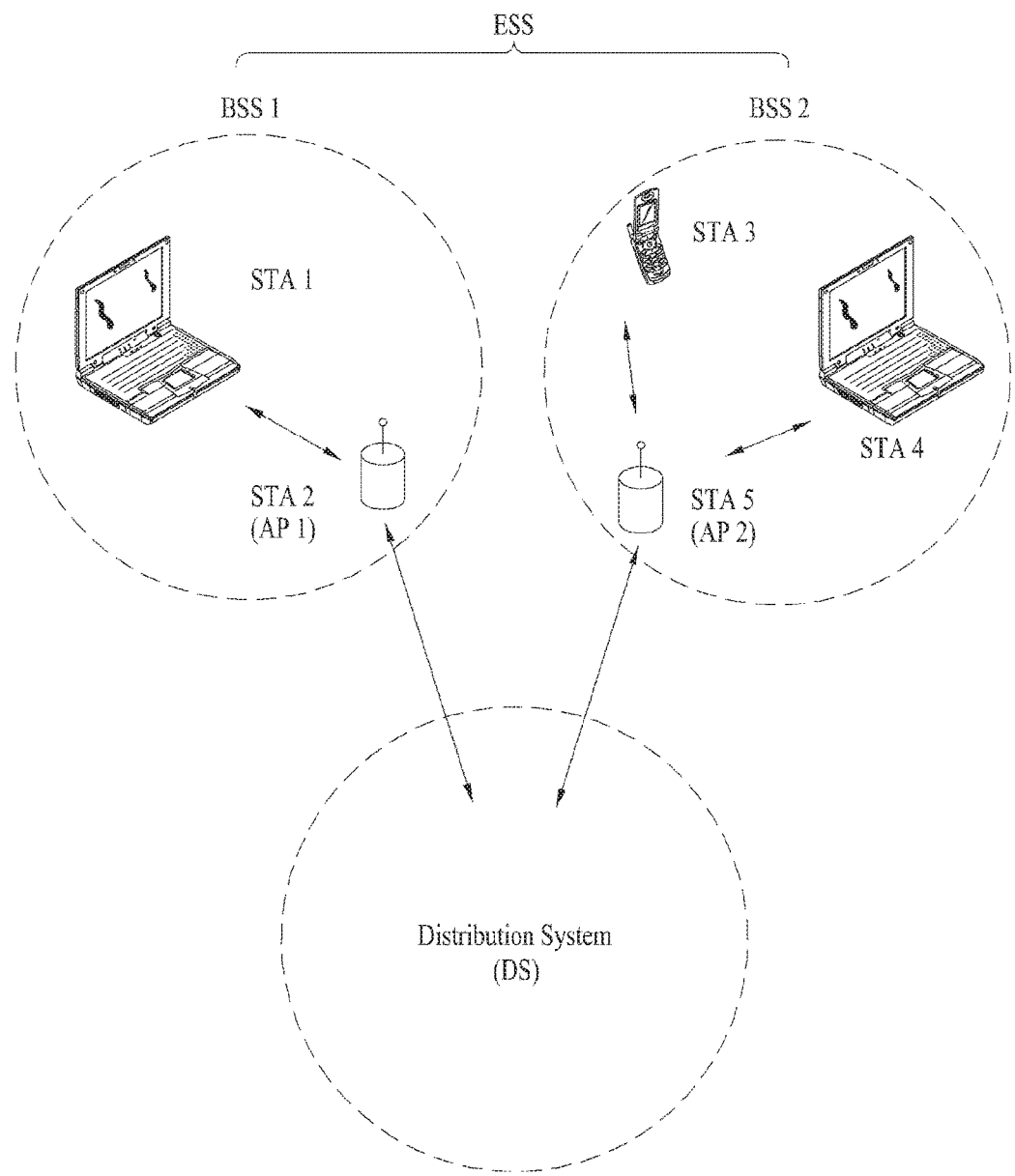
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in FIG. 3, a BSS1 and a BSS 2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like.

And, an AP is a concept corresponding to a BS (base station), a Node-B, an eNB (evolved Node-B), a BTS (base transceiver system), a femto BS, and the like in a different wireless communication field.

Figure 4:
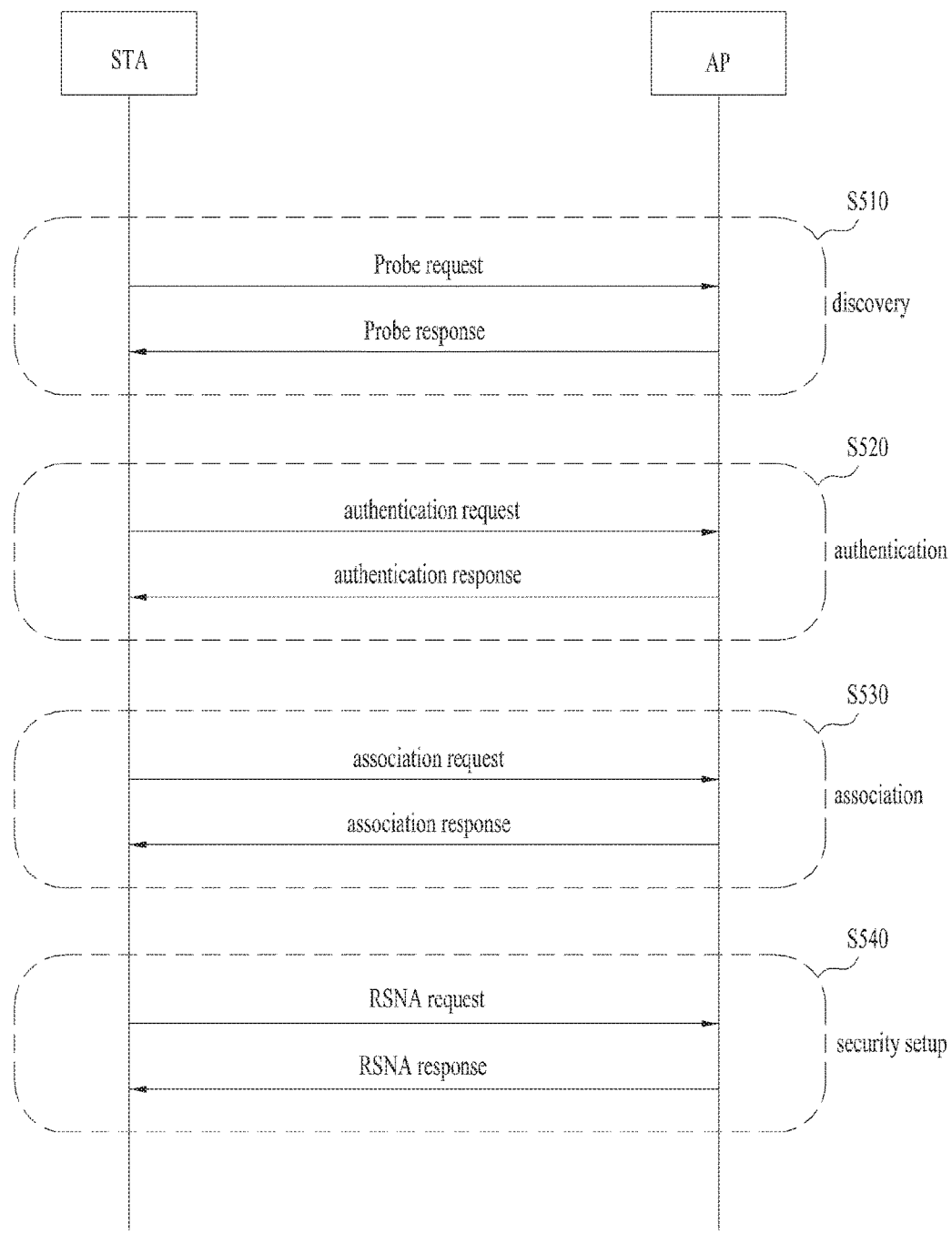
FIG. 4 is a diagram for explaining a general link setup procedure.
Figure 5:
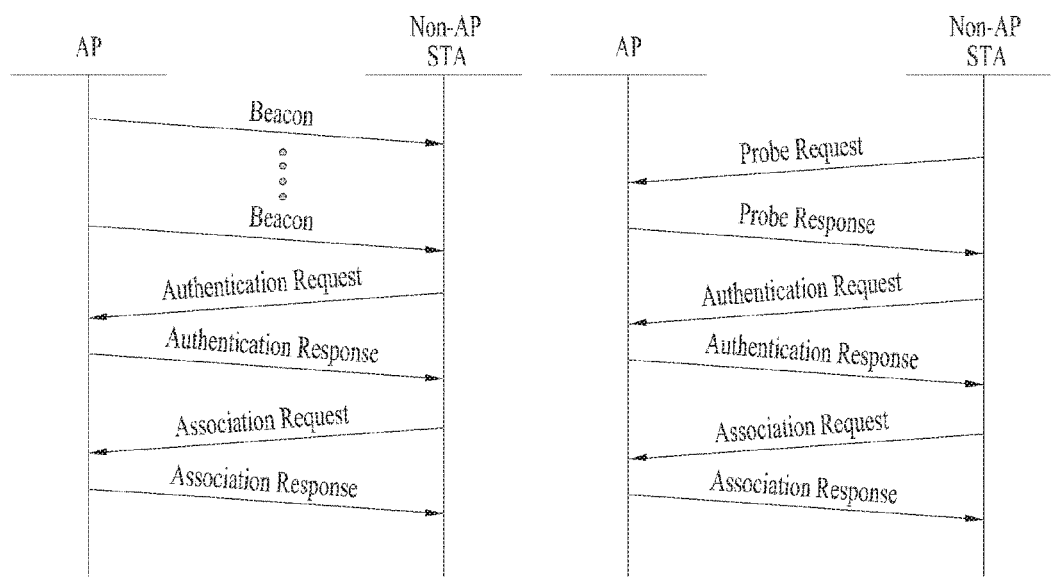
FIG. 5 is a diagram for explaining an active scanning method and a passive scanning method.

FIG. 4 is a diagram for explaining a general link setup procedure and FIG. 5 is a diagram for explaining an active scanning method and a passive scanning method.

In order for an STA to setup a link with a network and transceive data with the network, it is necessary for the STA to firstly discover the network, perform authentication, establish an association, and perform an authentication procedure for security and the like. A link setup procedure can also be referred to as a session initiation procedure or a session setup procedure. And, discovery of the link setup procedure, authentication, association, and security setting procedure can be commonly referred to as an association procedure.

An exemplary link setup procedure is explained with reference to FIG. 4.

In the step S410, an STA can perform a network discovery operation. The network discovery operation can include a scanning operation of the STA. In particular, in order for the STA to access a network, it is necessary to find out a network in which the STA is able to participate. An STA should identify a compatible network before the STA participates in a wireless network. A procedure of identifying a network existing at a specific region is referred to as scanning.

A scanning scheme includes active scanning and passive scanning. Although FIG. 4 shows a network discovery operation including an active scanning procedure for example, the network discovery operation can operate as a passive scanning procedure.

According to the active scanning procedure, an STA performing scanning transmits a probe request frame to discover an AP existing near the STA while changing channels and waits for a response in response to the probe request frame. A responder transmits a probe response frame to the STA, which has transmitted the probe request frame, in response to the probe request frame. In this case, the responder may correspond to an STA, which have finally transmitted a beacon frame in a BSS of a scanning channel. Since an AP transmits the beacon frame in the BSS, the AP becomes the responder. However, since a beacon frame is alternately transmitted by STAs in an IBSS, a responder is not fixed. For example, if an STA transmits a probe request frame on a first channel and receives a probe response frame on the first channel, the STA stores BSS-related information included in the received probe response frame and may be then able to perform scanning (i.e., transmit and receive probe request/response on a second channel) using an identical method by moving to a next channel (e.g., second channel).

Referring to FIG. 5, a scanning operation can be performed using a passive scanning scheme. In the passive scanning, STAs performing the scanning wait for a beacon frame while moving around channels. The beacon frame corresponds to one of management frames in IEEE 802.11. The beacon frame is periodically transmitted to notify the existence of a wireless network and make an STA performing scanning discover the wireless network and participate in the wireless network. An AP performs a role of periodically transmitting the beacon frame in a BSS and STAs belonging to an IBSS alternately transmit the beacon frame in the IBSS. Having received the beacon frame, the STA performing scanning stores information on a BSS included in the beacon frame and records beacon frame information at each channel while moving to a different channel. Having received the beacon frame, the STA stores BSS-related information included in the beacon frame, moves to a next channel, and may be then able to perform scanning at the next channel using an identical method.

If the active scanning and the passive scanning are compared with each other, the active scanning has a merit in that delay and power consumption are less compared to the passive scanning.

After the network is discovered by the STA, an authentication procedure can be performed in the step S420. In order to clearly distinguish the authentication procedure from a security setup operation described in the step S440, the authentication procedure can be referred to as a first authentication procedure.

An authentication procedure includes procedures that an STA transmits an authentication request frame to an AP and the AP transmits an authentication response frame to the STA in response to the authentication request frame. An authentication frame used for authentication request/response corresponds to a management frame.

An authentication frame can include information on an authentication algorithm number, an authentication transaction sequence number, a status code, a challenge text, an RSN (robust security network), a finite cyclic text, and the like. The aforementioned information corresponds to a part of information capable of being included in the authentication request/response frame. The information can be replaced with other information or additional information can be further included in the information.

The STA can transmit the authentication request frame to the AP. The AP can determine whether to permit authentication for the STA based on information included in the received authentication request frame. The AP can provide a result of the authentication process to the STA via the authentication response frame.

After the STA is successfully authenticated, an association procedure can be performed in the step S430. The association procedure includes procedures that the STA transmits an association request frame to the AP and the AP transmits an association response frame to the STA in response to the association response frame.

For example, the association request frame can include information on various capabilities, information on a beacon listening interval, information on an SSID (service set identifier), information on supported rates, information on supported channels, information on an RSN, information on a mobility domain, information on supported operating class, information on a TIM (traffic indication map) broadcast request, information on interworking service capability, and the like.

For example, the association response frame can include information on various capabilities, information on a status code, information on an AID (association ID), information on supported rates, information on an EDCA (enhanced distributed channel access) parameter set, information on an RCPI (received channel power indicator), information on an RSNI (received signal to noise indictor), information on a mobility domain, information on a timeout interval (association comeback time), information on an overlapping BSS scan parameter, information on a TIM broadcast response, information on a QoS map, and the like.

The aforementioned information corresponds to a part of information capable of being included in the association request/response frame. The information can be replaced with other information or additional information can be further included in the information.

After the STA is successfully associated with the network, a security setup procedure can be performed in the step S540. The security setup procedure of the step S440 may correspond to an authentication procedure authenticated via an RSNA (robust security network association) request/response, the authentication procedure of the step S520 may correspond to a first authentication procedure, and the security setup procedure of the step S540 can be simple referred to as an authentication procedure.

The security setup procedure of the step S440, for example, can include a procedure for performing private key setup via 4-way handshaking through an EAPOL (extensible authentication protocol over LAN) frame. And, the security setup procedure can also be performed according to a security scheme not defined in IEEE 802.11 standards.

Figure 6:
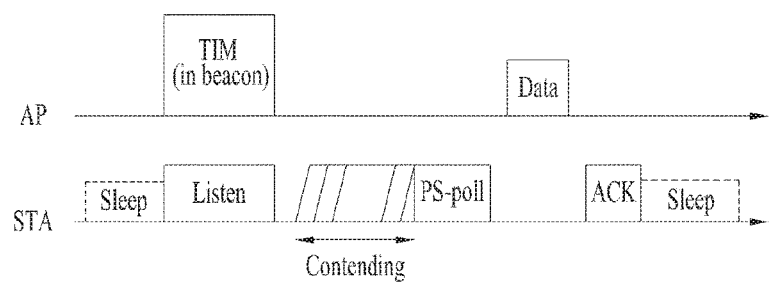
FIGS. 6 to 8 are diagrams for explaining an operation of a station which has received TIM.
Figure 7:
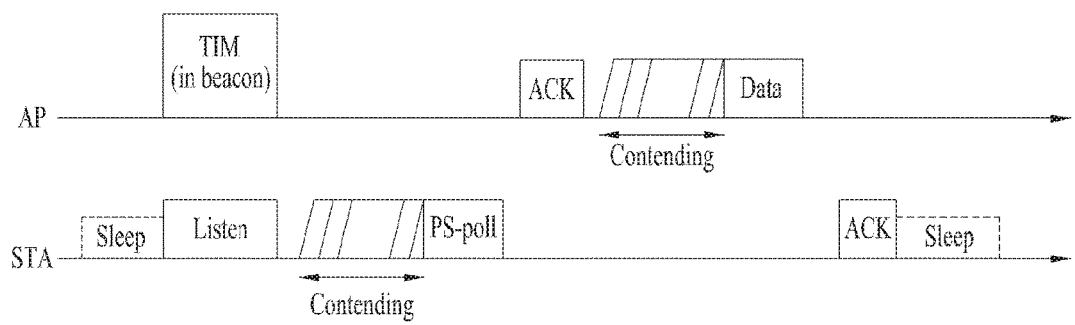
Figure 8:
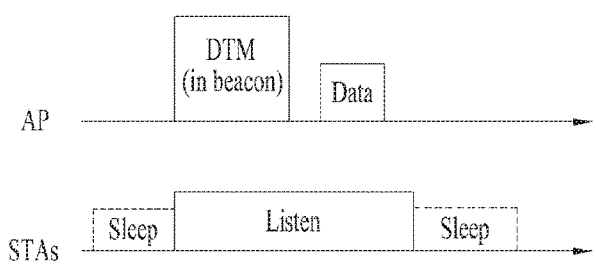

FIGS. 6 to 8 are diagrams for explaining an operation of a station which has received TIM.

Referring to FIG. 6, an STA switches to an awake state from a sleep state to receive a beacon frame including a TIM (traffic indication map) from an AP. The STA interprets a received TIM element and may be then able to know that there is buffered traffic to be transmitted to the STA. The STA performs contention with other STAs to access a media for transmitting a PS-poll frame and may be then able to transmit the PS-poll frame to the AP to make a request for transmission of a data frame. Having received the PS-poll frame from the STA, the AP can transmit a frame to the STA. The STA receives a data frame from the AP and may be then able to transmit a confirmation response (ACK) to the AP in response to the data frame. Subsequently, the STA may switch to the sleep state again.

As shown in FIG. 6, having received the PS-poll frame from the STA, the AP may operate according to an immediate response scheme transmitting a data frame after a prescribed time (e.g., SIFS (short inter-frame space)). Meanwhile, if the AP fails to prepare a data frame to be transmitted to the STA during the SIFS time after the PS-poll frame is received from the STA, the AP may operate according to a deferred response scheme. Regarding this, it is explained with reference to FIG. 7.

Referring to an example of FIG. 7, similar to the example of FIG. 6, an STA switches to an awake state from a sleep state, receives a TIM from an AP, and transmits a PS-poll frame to the AP via contention. After the PS-poll frame is received, if the AP fails to prepare a data frame during SIFS, the AP can transmit an ACK frame to the STA instead of the data frame. After the ACK frame is transmitted, if the data frame is ready, the AP can transmit the data frame to the STA after contention is performed. The STA transmits an ACK frame indicating that the data frame is successfully received to the AP and may switch to the sleep state.

FIG. 8 is a diagram for an example that an AP transmits a DTIM. STAs can switch to an awake state from a sleep state to receive a beacon frame including a DTIM element from an AP. The STAs are able to know that a multicast/broadcast frame is to be transmitted via the received DTIM. The AP can transmit a data (i.e., multicast/broadcast frame) without an operation of transmitting and receiving a PS-poll frame after the beacon frame including the DTIM is transmitted. After the beacon frame including the DTIM is received, the STAs receive data while continuously maintaining the awake state. After the data reception is completed, the STAs can switch to the sleep state again.

Sounding for Beamforming

In the following, a sounding method for beamforming proposed by the present invention is explained.

Figure 9:
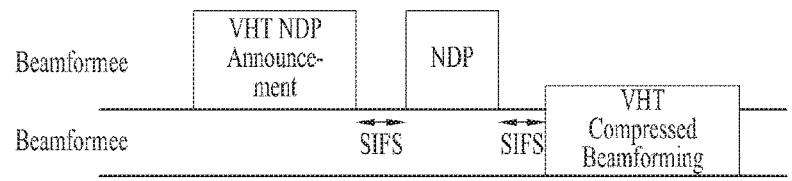
FIG. 9 is a diagram for explaining a sounding procedure which is performed for VTH beamforming.

FIG. 9 is a diagram for explaining a sounding procedure which is performed for VTH beamforming.

In FIG. 9, a beamformer corresponds to a device for transmitting data using a beamforming scheme. In general, the beamformer corresponds to an AP. And, a beamformee corresponds to a device for receiving data using a beamforming scheme. In general, the beamformee corresponds to an STA rather than the AP. In the following, for clarity, assume that a beamformer and a beamformee correspond to an AP and an STA, respectively. Yet, distinction between the AP and the STA may vary depending on system implementation.

Referring to FIG. 9, an AP can transmit an NDP-A (non data packet announcement) frame to one or more STAs. The NDP-A frame can include information on an NDP frame to be transmitted and information on a feedback scheme for transmitting beamforming feedback information. When the NDP-A frame is transmitted, the AP transmits an NDP to an STA after SIFS. The NDP can include specific information for measuring a channel.

Having received the NDP, the STA can report a channel measurement result to the AP in a form of a compressed beamforming report. In this case, although the STA is able to individually measure all subcarriers or tones, the STA is able to measure a channel in a prescribed group unit by grouping the subcarriers or tones with a certain number. The grouping can be represented by a tone grouping element (Ng).

When the AP measures channels of STAs, the AP can inform the STAs of a unit of a tone group for measuring the channels by including Ng value in the NDP-A frame. The STAs can generate feedback information based on the unit of the tone group. In case of IEEE 802.11ac system, a tone group for performing beamforming feedback uses one selected from the group consisting of 1, 2 and 4 irrespective of a bandwidth in use.

Figure 10:
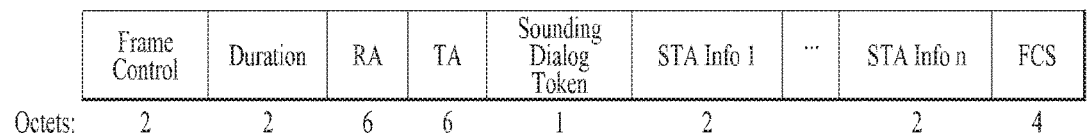
FIG. 10 is a diagram for an NDP-A frame format.

FIG. 10 is a diagram for an NDP-A frame format.

As shown in FIG. 10, an NDP-A frame can include at least one or more STA information fields (STA info field). If a single STA information field is included in the NDP-A frame only, an RA field can include AID of a corresponding STA. If the NDP-A frame includes a plurality of STA information fields, the RA field can indicate a broadcast address.

A TA field includes an address of a device that transmits the NDP-A frame.

In FIG. 10, a sounding dialog token field includes a sounding dialog token number and the sounding dialog token number corresponds to a number selected by the AP to distinguish NDP-A frames from each other.

Figure 11:
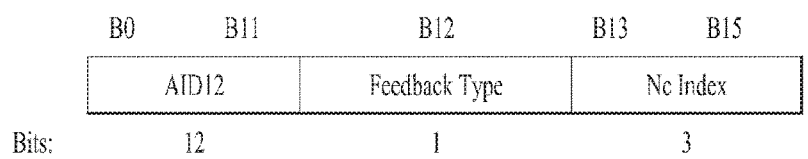
FIG. 11 is a diagram for one of STA information fields shown in FIG. 10.

FIG. 11 is a diagram for one of STA information fields shown in FIG. 10.

Information of 3 subfields shown in FIG. 11 are described in the following.

TABLE 1

| Field | Description |
| --- | --- |
| AID12 | Contains the 12 least significant bits of fee AID of a STA expected to process the following VHT NDP and prepare the sounding feedback. Equal to 0 if the STA is an AP, mesh STA. or STA that is a member of an IBSS. |
| Feedback Type | Indicates the type of feedback requested. Set to 0 for SU. Set to 1 for MU. |
| Nc Index | If the Feedback Type field indicates MU, then Nc Index indicates the number of columns, Nc, in the Compressed Beamforming Feedback Matrix subfield minus 1: Set to 0 to request Nc = 1 Set to 1 to request Nc = 2 . . . Set to 7 to request Nc = 8 Reserved if the Feedback Type field indicates SU. |

HE PPDU Format

Although a frame structure for IEEE 802.11ax has not been determined yet, it may be able to anticipate it as follows.

Figure 12:
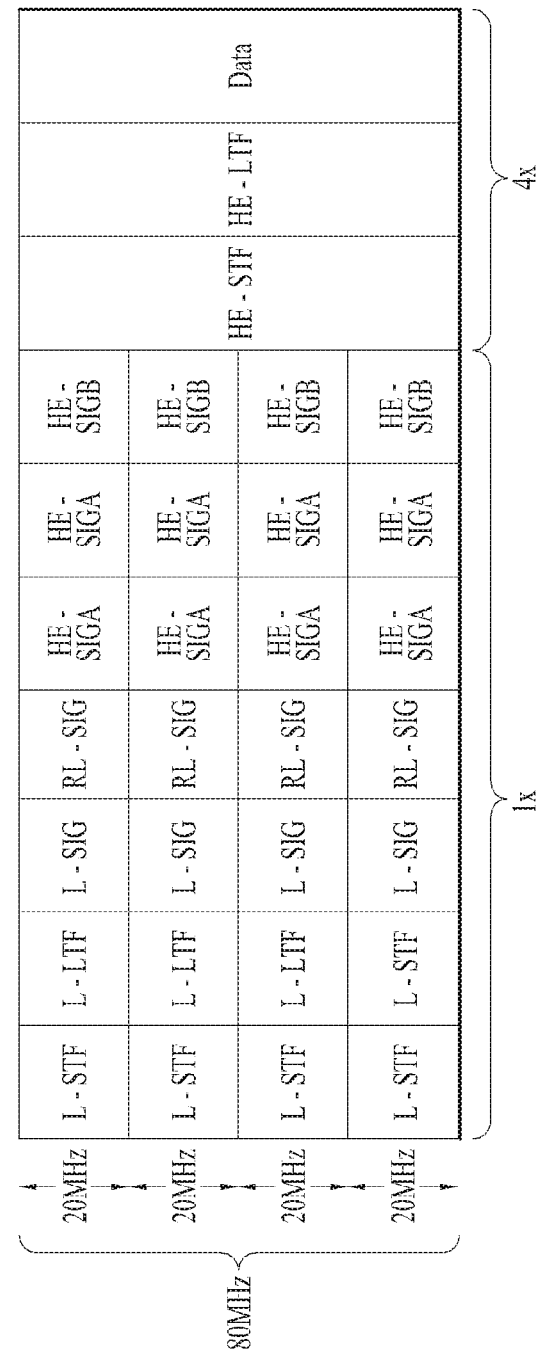
FIG. 12 is a diagram for an example of a HE (high efficiency) PPDU format according to one embodiment of the present invention.

FIG. 12 is a diagram for an example of a HE (high efficiency) PPDU format according to one embodiment of the present invention.

Similar to the frame structure shown in FIG. 12, 11ax maintains a legacy 1× symbol structure (3.2 us) until HE-SIG (SIG-A, SIG-B). HE-preamble and data part can use a frame structure including 4× symbol (12.8 us) structure. Of course, unless it is directly contrary to the following description, although the aforementioned structure is changed, the preset invention can be applied without any problem.

L-part may follow L-STF, L-LTF, and L-SIG configuration according to a form maintained by a legacy WiFi system as it is. In general, it is preferable for the L-SIG to deliver packet length information. HE-part corresponds to a part newly configured for 1 lax standard (high efficiency). HE-SIG (HE-SIGA and HE-SIGB) may exist between the L-part and HE-STF and may be able to notify common control information and user specific information. Specifically, the HE-SIG can include HE-SIF-A for delivering the control information and HE-SIG B for delivering the user specific information.

Proposed Sounding Scheme in HE System

As mentioned in the foregoing description, feedback is transmitted using carrier grouping/tone grouping to perform beamforming in 11ac. In this case, number of carrier grouping (i.e., Ng), which is used irrespective of a bandwidth for transmitting data, corresponds to 1, 2, and 4. On the contrary, as mentioned earlier with reference to FIG. 12, data is transmitted using 4× symbol structure and OFDMA in 11ax to enhance efficiency of the data transmission. Hence, in case of transmitting data by performing beamforming, it is necessary to have a feedback method for performing efficient beamforming.

Hence, one embodiment of the present invention proposes a beamforming feedback method capable of efficiently reducing feedback overhead in consideration of a transmission method of 11ax. Specifically, in 11ax, when beamforming is performed, in order to efficiently perform beamforming feedback, the feedback can be transmitted using # of subcarrier grouping/tone grouping element.

Figure 13:
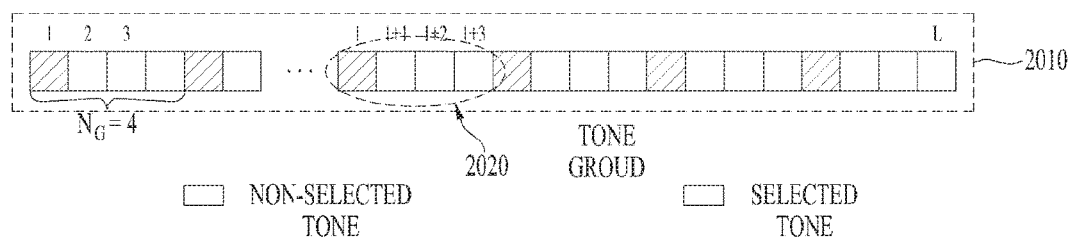
FIG. 13 is a diagram for explaining a scheme of using an extended tone grouping element according to one embodiment of the present invention.

FIG. 13 is a diagram for explaining a scheme of using an extended tone grouping element according to one embodiment of the present invention.

In FIG. 13, assume a MIMO system including L number of OFDM tones. Each of the L number of OFDM tones is represented by a box. Under a concept of tone grouping, the L number of tones can be grouped by the number of tones corresponding to an Ng value. Hence, each tone group includes Ng number of continuous tones and the Ng may be referred to as a tone group size.

Tone grouping is performed under the consideration that tones belonging to a tone group are associated with each other in a certain level. For example, as mentioned in the foregoing embodiment of the present invention, Ng can be configured by 4 or less. In this case, as shown in FIG. 13, 4 tones form a single tone group. Since channel response values corresponding to I, I+1, I+2, and I+3 tone, which are included in a tone group 2020, are associated with each other in a certain level, feedback on the channel response values is performed not on each of the 4 tones but on the tone I only.

As mentioned in the foregoing description, besides the feedback on the channel response value corresponding to the tone I only, it may be able to transmit an average value of channel response values of tones belonging to an Ng tone group instead of transmitting the value of the tone I in consideration of association of each tone. Or, it may be able to feedback a channel response value by performing interpolation or smoothing.

As mentioned in the foregoing description, since the 11ax transmits data using the 4× symbol structure, data can be transmitted using a subcarrier spacing smaller than a subcarrier spacing of the 11ac as much as ¼. This indicates that the tone group 2020 shown in FIG. 13 including the tone I, I+1, I+2, and I+3 may correspond to a single tone of the 11ac. Hence, it is preferable to transmit beamforming feedback using a value greater than the Ng value (i.e., 1, 2, and 4) used in the 11ac for beamforming feedback as much as 4 times. In particular, while granularity of the legacy Ng is used as it is, it may be able to configure the Ng by a multiple of 4 in a manner of applying granularity greater than the granularity of the legacy Ng as much as 4 times in the 11 ax. Specifically, beamforming feedback can be transmitted after subcarrier grouping is performed by selecting one from among 4, 8, and 16 as the Ng.

Figure 14:
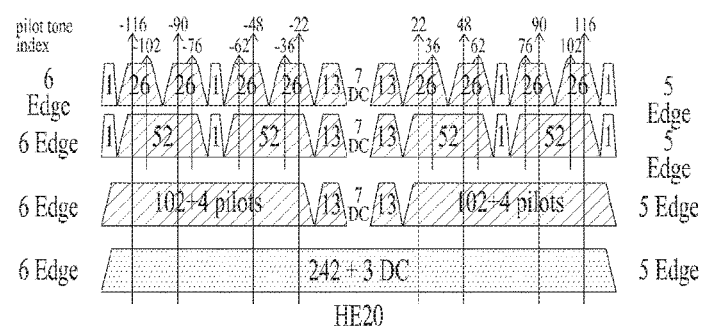
FIGS. 14 to 16 are diagrams for a scheme of allocating a tone according to a bandwidth in accordance with one embodiment of the present invention.
Figure 15:
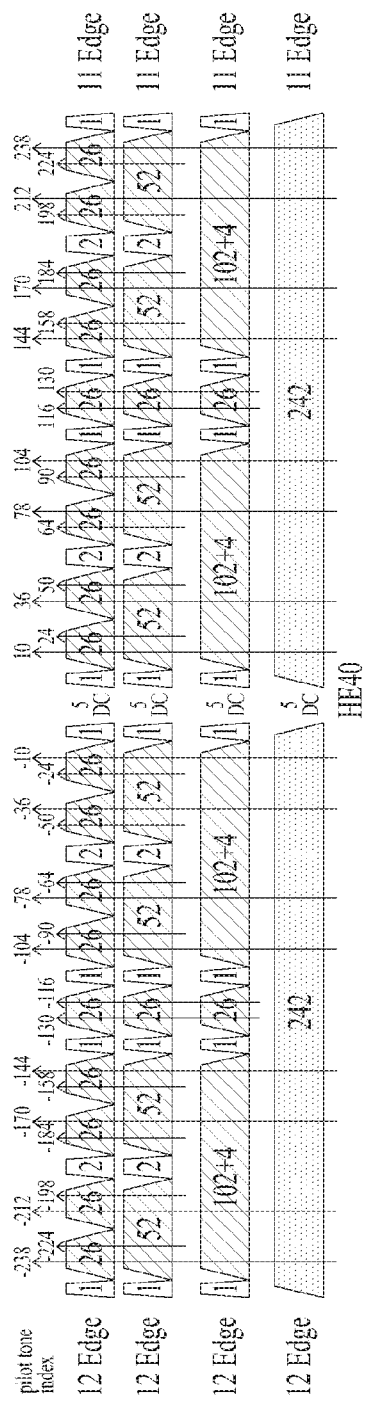
Figure 16:
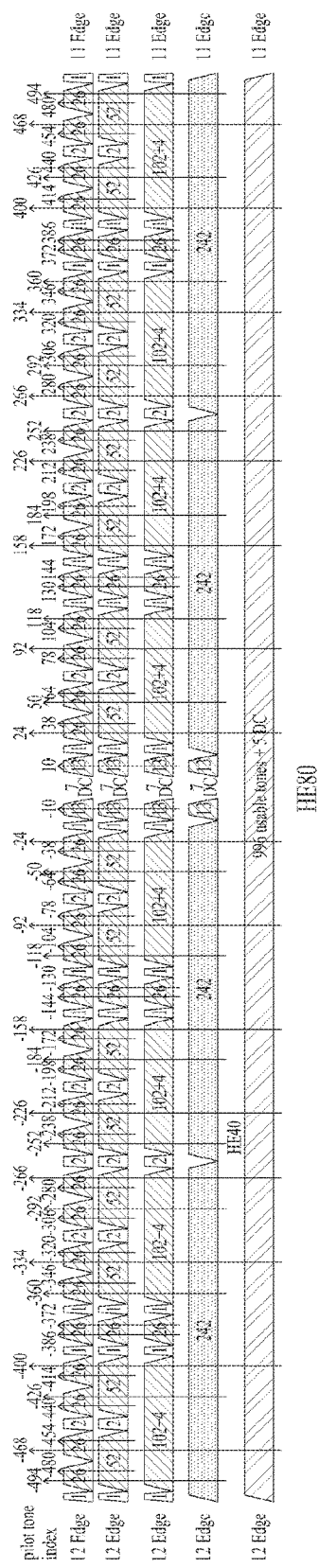

FIGS. 14 to 16 are diagrams for a scheme of allocating a tone according to a bandwidth in accordance with one embodiment of the present invention.

Specifically, FIG. 14 shows a case of using a bandwidth of 20 MHz, FIG. 15 shows a case of using a bandwidth of 40 MHz, and FIG. 16 shows a case of using a bandwidth of 80 MHz.

As shown in FIGS. 14 to 16, a subcarrier index according to Ng, which is used for making a feedback on a signal beam formed using tone allocation, can be defined for 20 MHz channel as follows for example. Since a location and a number of a pilot in use vary according to an RB, a subcarrier index according to Ng can be represented as follows according to an RB size in 20 MHz.

TABLE 2

| | |
| --- | --- |
| Ng = 4 | ±121, ±117, ±113, ±109, ±105, ±101, ±97, ±93, ±89, ±85, ±81, ±77, ±73, ±68, ±64, ±60, ±56, |

TABLE 2-continued

| | |
|---|---|
| | ±52, ±47, ±43, ±39, ±35, ±31, ±27, ±23, ±19, ±15, ±11, ±7, ±4 |
| | Pilot subcarriers and DC subcarrier not used |
| Ng = 8 | ±121, ±113, ±105, ±97, ±89, ±81, ±73, ±64, ±56, ±47, ±39, ±31, ±23, ±15, ±7, ±4 |
| | Pilot subcarriers and DC subcarrier not used |
| Ng = 16 | ±121, ±105, ±89, ±73, ±56, ±39, ±23, ±7, ±4 |
| | Pilot subcarriers and DC subcarrier not used |

TABLE 3

| | |
|---|---|
| Ng = 4 | ±122, ±118 ±114 ±110 ±106 ±102 ±98 ±94 ±89 ±85 ±81 ±77 ±73 ±69 ±65 ±61, ±57 ±53 ±49 ±45 ±41 ±37 ±33 ±29 ±25 ±21 ±17 ±13 ±9 ±5, ±4 |
| | Pilot subcarriers and DC subcarrier not used |
| Ng = 8 | ±122, ±114 ±106 ±98 ±89 ±81 ±73 ±61, ±53 ±45 ±37 ±29 ±21 ±13 ±5, ±4 |
| | Pilot subcarriers and DC subcarrier not used |
| Ng = 16 | ±122, ±106 ±89 ±73, ±53 ±37 ±21 ±5, ±4 |
| | Pilot subcarriers and DC subcarrier not used |

TABLE 4

| | |
|---|---|
| Ng = 4 | ±122, ±118 ±114 ±110 ±106 ±102 ±98 ±94 ±89 ±85 ±81 ±77 ±73 ±69 ±65 ±61, ±57 ±53 ±49 ±45 ±41 ±37 ±33 ±29 ±25 ±21 ±17 ±13 ±9 ±5, ±2, |
| | Pilot subcarriers and DC subcarrier not used |
| Ng = 8 | ±122, ±114 ±106 ±98 ±89 ±81 ±73 ±61, ±53 ±45 ±37 ±29 ±21 ±13 ±5, ±2 |
| | Pilot subcarriers and DC subcarrier not used |
| Ng = 16 | ±122, ±106 ±89 ±73, ±53 ±37 ±21 ±5, ±2 |
| | Pilot subcarriers and DC subcarrier not used |

Ng interval starting from a last left subcarrier/last right subcarrier available according to an RB size. In this case, if the subcarrier index corresponding to the Ng interval is matched with a pilot index or a left over tone, it may be able to use a next subcarrier index. Thereafter, it may be able to use a subcarrier corresponding to the Ng interval again by making the next subcarrier index to be a start point.

As a different method, if a subcarrier index is matched with a pilot index or a left over tone, a previous carrier of the tone is used for making a feedback and it may be able to use a subcarrier corresponding to an Ng interval again for making a feedback by making the subcarrier index to be a start point.

And, one of a left and a right tone near a DC can be used for feedback. For example, when Ng corresponds to 4, if Dc corresponds to 0 and a subcarrier index near the DC, which is selected using the aforementioned method, corresponds to ±2, the subcarrier index adds ±1 instead of being terminated.

As a different method, information on a carrier is fed back with an Ng interval within an available tone and information on a corresponding tone can be transmitted only near a DC.

A size of the Ng is just an example only. It is able to define a subcarrier index used for making a feedback using the aforementioned method for a different Ng size as well.

It may consider an Ng size (e.g., 2) smaller than the aforementioned Ng size 4 in consideration of feedback in outdoor where a channel status is not good. In this case, it may also be able to transmit beamforming feedback using an index described in the following in consideration of the aforementioned method.

TABLE 5

| | |
|---|---|
| RB = 26, 52 | ±121, ±119, ±117, ±115, ±113, ±111, ±109, ±107, ±105, ±103, ±101, ±99, ±97, ±95, ±93, ±91, ±89, ±87, ±85, ±83, ±81, ±79, ±77, ±75, ±73, ±71, ±69, ±67, ±65, ±63, ±61, ±59, ±57, ±55, ±53, ±51, ±49, ±47, ±45, ±43, ±41, ±39, ±37, ±35, ±33, ±31, ±29, ±27, ±25, ±23, ±21, ±19, ±17, ±15, ±13, ±11, ±9, ±7, ±5, ±4 |
| | Pilot subcarriers and DC subcarrier not used |
| RB = 106 | ±122, ±120 ±118 ±115 ±113 ±111 ±109 ±107 ±105 ±103 ±101 ±99 ±97 ±95 ±93 ±91 ±89 ±87 ±85 ±83 ±81 ±79 ±77 ±75 ±73 ±71 ±69 ±67 ±65 ±63 ±61 ±59 ±57 ±55 ±53 ±51 ±49 ±47 ±45 ±43 ±41 ±39 ±37 ±35 ±33 ±31 ±29 ±27 ±25 ±23 ±21 ±19 ±17 ±15 ±13 ±11 ±9 ±7 ±5 ±4 |
| | Pilot subcarriers and DC subcarrier not used |
| RB = 242 | ±122, ±120 ±118 ±115 ±113 ±111 ±109 ±107 ±105 ±103 ±101 ±99 ±97 ±95 ±93 ±91 ±89 ±87 ±85 ±83 ±81 ±79 ±77 ±75 ±73 ±71 ±69 ±67 ±65 ±63 ±61 ±59 ±57 ±55 ±53 ±51 ±49 ±47 ±45 ±43 ±41 ±39 ±37 ±35 ±33 ±31 ±29 ±27 ±25 ±23 ±21 ±19 ±17 ±15 ±13 ±11 ±9 ±7 ±5 ±3 ±2 |
| | Pilot subcarriers and DC subcarrier not used |

Specifically, Table 2 shows a case of using a channel of 20 MHz and using 26 and 52 RB size, Table 3 shows a case of using a channel of 20 MHz and using 106 RB size, and Table 4 shows a case of using a channel of 20 MHz and using 242 RB size.

Similar to a method of obtaining a carrier index for the 20 MHz, it may be able to apply the same method to a different BW (e.g., 40 MHz, 80 MHz). In particular, for example, when Ng corresponds to 4, a start subcarrier index is used for making a feedback on a subcarrier index corresponding to an Referring to Table 5, it may be able to transmit feedback information using an additional tone (±4 or ±2) in response to a tone near a DC or it may be able to transmit a tone corresponding to an Ng interval only within a determined available tone.

And, the Ng value can be determined in consideration of an RB size of OFDMA of flax. In the 11ax, a size of a resource block using OFDMA corresponds to 26, 52, 106, 242, 484, and 996. Tone allocation according to a resource unit in each bandwidth can be represented as FIGS. 14 to 16.

As shown in FIGS. 14 to 16, data can be transmitted using tone allocation different from each other according to an RB size used for OFDMA in each BW. Hence, in case of using beamforming in the OFDMA, allocation of a tone on which data is loaded may vary according to an RB size, a pilot, and a bandwidth. And, since feedback information transmits information on a data tone except a pilot, as mentioned in the foregoing description, in case of applying such an Ng as 4, 8 and 16, the feedback information may correspond to a value starting from a random position rather than a value starting from a carrier on which an RB of the feedback information starts. Depending on a feedback method, information on a different RB instead of an RB of the feedback information can be transmitted in a manner of being included in the feedback information. Hence, in case of transmitting feedback using the OFDMA, it is able to transmit the feedback using an Ng size described in the following based on a minimum RB size. In particular, feedback can be performed based on the minimum RB size (=based on 26 tones). In this case, for example, it is able to transmit a channel response value using a value described in the following as the Ng size.

A minimum RB size of OFDMA corresponds to 26 and the number of subcarriers used for transmitting data corresponds to 24 except 2 pilots. And, 52 RBs, 106 RBs and 242 RBs use 48, 102, and 234 subcarriers, respectively. Hence, the number of subcarriers used for transmitting data can be represented by a multiple of 6 irrespective of an RB size. Hence, an Ng can be configured by a multiple of 6. If the Ng corresponds to 6, a corresponding subcarrier index is represented as follows.

TABLE 6

| | |
|---|---|
| Ng = 6 | ±121 ±115 ±109 ±103 ±97 ±91 ±85 ±79 ±73 ±67 ±61 ±55 ±49 ±43 ±37 ±31 ±25 ±19 ±13 ±7 ±4 Pilot subcarriers and DC subcarrier not used |
| Ng = 12 | ±121 ±115 ±103 ±91 ±79 ±67 ±55 ±43 ±31 ±19 ±7 ±4 Pilot subcarriers and DC subcarrier not used |

TABLE 7

| | |
|---|---|
| Ng = 6 | ±122 ±115 ±109 ±103 ±97 ±91 ±85 ±79 ±73 ±67 ±61 ±55 ±49 ±43 ±37 ±31 ±25 ±26 ±20 ±14 ±8 ±4 Pilot subcarriers and DC subcarrier not used |
| Ng = 12 | ±122 ±109 ±97 ±85 ±73 ±61 ±49 ±37 ±25 ±20 ±8 ±4 Pilot subcarriers and DC subcarrier not used |

TABLE 8

| | |
|---|---|
| Ng = 6 | ±122 ±115 ±109 ±103 ±97 ±91 ±85 ±79 ±73 ±67 ±61 ±55 ±49 ±43 ±37 ±31 ±25 ±26 ±20 ±14 ±8 ±4 Pilot subcarriers and DC subcarrier not used |
| Ng = 12 | ±122 ±109 ±97 ±85 ±73 ±61 ±49 ±37 ±25 ±20 ±8 ±4 Pilot subcarriers and DC subcarrier not used |

Specifically, Table 6 shows a case of using 26 and 52 RBs on a channel of 20 MHz, Table 7 shows a case of supporting 106 RBs on a channel of 20 MHz, and Table 8 shows a case of supporting 242 RB size on a channel of 20 MHz.

According to a different embodiment of the present invention, a minimum RB size (26) of OFDMA or an RB size/2 (13) can be used as a value of Ng. In this case, a subcarrier index according to the Ng can be used according to an RB size as described in the following.

TABLE 9

| | |
|---|---|
| Ng = 13 | ±121, ±108 ±95 ±82 ±68 ±55 ±42 ±29 ±16 ±4 Pilot subcarriers and DC subcarrier not used |
| Ng = 26 | ±121, ±95 ±68 ±42 ±16 ±4 Pilot subcarriers and DC subcarrier not used |

TABLE 101

| | |
|---|---|
| Ng = 13 | ±122 ±109 ±96 ±83 ±70 ±57 ±44 ±31 ±18 ±5 ±4 |
| Ng = 26 | ±122 ±96 ±70 ±44 ±18 ±4 |

Specifically, Table 9 shows a case of using 26 and 52 RBs on a channel of 20 MHz and Table 10 shows a case of using 106, 242 RBs on a channel of 20 MHz As mentioned in the foregoing description, it may be able to use a different subcarrier index according to an RB in accordance with a value of Ng for performing feedback. Or, it may be able to use a subcarrier index corresponding to a small RB according to a value of the Ng.

And, it may be able to perform beamforming feedback using information corresponding to a subcarrier only according to the Ng or using an average value of information of subcarriers as many as a size of the Ng. In case of using the average value, the aforementioned indexes can be used as an index of a start subcarrier.

The Ng used for performing beamforming feedback in 11ax may be able to use a single set which is configured by selecting a part from among 2, 4, 8, 16, 6, 12, 13, and 26 proposed in the aforementioned embodiments. It may use a small Ng value at outdoor where channel environment is good and it may be able to use a big Ng value (e.g., 13, 16, 26, etc.) at indoor.

As a different method, unlike the aforementioned method of configuring a subcarrier index for feedback using all available tones within a bandwidth, in case of using OFDMA in 11ax, it may be able to perform feedback by applying an Ng for feedback in a subcarrier corresponding to an allocated RB size.

A subcarrier index proposed in the aforementioned embodiments for beamforming feedback corresponds to an example for a case of transmitting 4×LTF. Although a type of LTF corresponds to 2× or 1×, a subcarrier of an interval corresponding to a size of the Ng is used for feedback. However, unlike the 4×LTF, since the 2×/1×LTF transmits an LTF sequence with an interval of 2 tones/4 tones, it is unable to use all available tones within a bandwidth. For example, in case of using the 2×LTF, since an LTF sequence is transmitted in a unit of 2 tones, all of the LTF sequence is loaded on an even tone and the LTF sequence is able to use a subcarrier index identical to a subcarrier index used by a pilot and a left over tone. Since it is unable to use information on the tone, in case of making a feedback on a subcarrier of the index according to a size of Ng, feedback can be performed using a previous subcarrier index of the index or a next carrier index. In particular, similar to the method proposed in the 4×LTF, feedback is performed using a corresponding subcarrier index according to the Ng size. In this case, if a subcarrier index on which feedback is to be performed is identical to a pilot or a left over tone index, feedback is performed using a previous or a next subcarrier on which 2×/1×LTF sequence is transmitted, i.e., a previous or a next subcarrier transmitted in a unit of 2 tones or 4 tones.

Meanwhile, as a method different from the aforementioned embodiment, it may be able to perform interpolation or smoothing on channel information of a unit of 2/4 tones obtained by using 2×/1×LTF and measure channel information on all available tones. Subsequently, as mentioned in the foregoing description, feedback can be performed using information of a subcarrier index corresponding to the Ng size.

In case of using OFDMA for the aforementioned 2×LTF and the 1×LTF, feedback can be performed by applying Ng in an allocated RB size.

Figure 17:
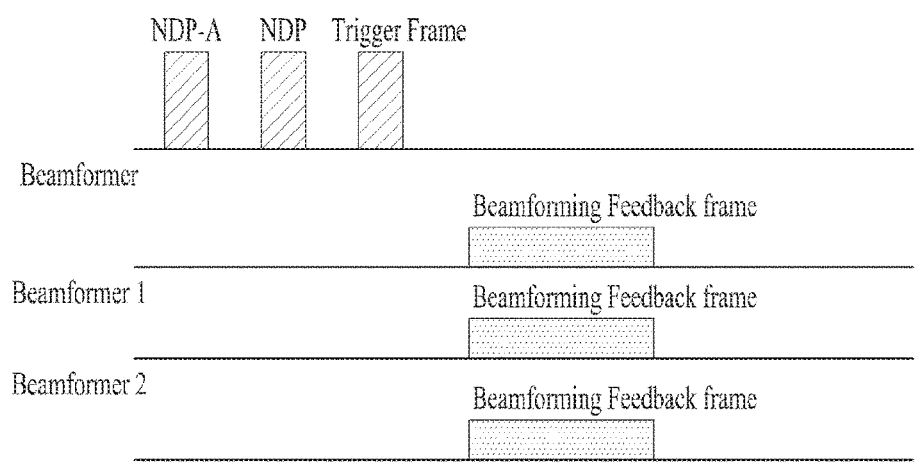
FIG. 17 is a diagram for explaining a method of performing sounding by applying embodiments of the present invention.

FIG. 17 is a diagram for explaining a method of performing sounding by applying embodiments of the present invention.

As mentioned earlier with reference to FIG. 9, an AP transmits an NDP-A frame and transmits an NDP in succession to the NDP-A. And, an STA transmits beamforming feedback based on the NDP. On the contrary, according to an example of FIG. 17, assume a case that the AP performs sounding for performing beamforming on a plurality of STAs. Hence, it is required for the AP to transmit a trigger frame to make STAs perform feedback transmission after the NDP frame is transmitted. The STAs can transmit a feedback frame in response to the trigger frame.

As mentioned in the foregoing description, according to one embodiment of the present invention, a value of Ng greater than a minimum value of Ng value of 11ac as much as 4 times can be used as a minimum Ng value. Specifically, the Ng value can be configured by a value selected from the group consisting of 4, 8 and 16. In some cases, the Ng value can be configured by a value selected from among 4 and 16. An AP can inform an STA of an Ng value selected from among the aforementioned Ng values via an NDP-A frame to make the STA perform feedback according to the selected Ng value.

Meanwhile, as mentioned in the foregoing description, one embodiment of the present invention proposes to perform feedback of STAs in a unit of 26 tones corresponding to an RU while an Ng value corresponding to a multiple of 4 is used. In particular, for example, the STAs generate feedback information according to Ng=4 and the feedback can be performed in a unit of 26 tones.

To this end, an AP can transmit information on a starting RU and information on an ending RU to the STAs via the NDP-A frame to inform the STAs of a range of the feedback.

Figure 18:
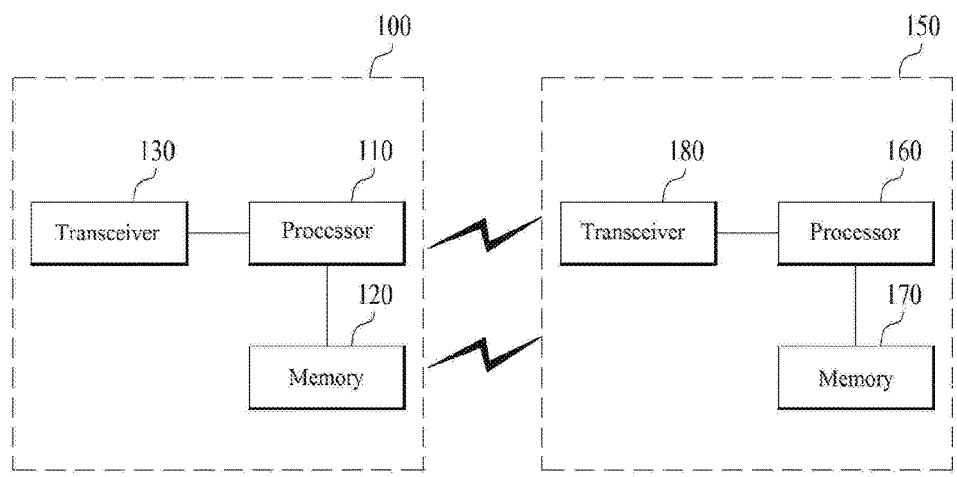
FIG. 18 is a block diagram for an exemplary configuration of an AP (or a base station) and an STA (or a UE) according to one embodiment of the present invention.

FIG. 18 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 19:
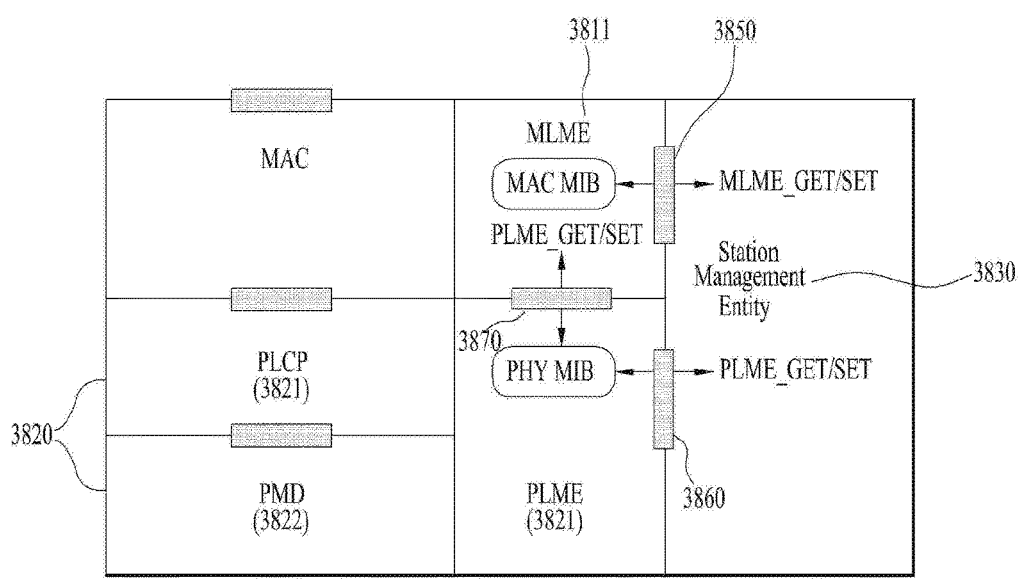
FIG. 19 is a diagram for an exemplary configuration of a processor of an AP or an STA according to one embodiment of the present invention.

FIG. 19 is a diagram for an exemplary configuration of a processor of an AP or an STA according to one embodiment of the present invention.

A processor of an AP or an STA may have a structure of a plurality of layers. FIG. 19 mainly shows a MAC sublayer 3810 and a physical layer 3820 on a DLL (data link layer) among a plurality of the layers. As shown in FIG. 19, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 19 interact with each other using various schemes. FIG. 19 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 19, the MLME 3811 and the SME 3830 can exchange various MLME_GET/SET primitives with each other via an MLME_SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

As mentioned in the foregoing description, embodiments of the present invention can be applied to various wireless communication systems including IEEE 802.11 system.

What is claimed is:

1. A method of performing sounding by an access point (AP) with one or more stations (STAs) for a beamforming scheme in a second type wireless local area network (WLAN) system using a second subcarrier spacing, the method comprising:
   transmitting a specific signal to the one or more STAs by the AP via a plurality of tones; and
   receiving a beamforming feedback from the one or more STAs,
   wherein the beamforming feedback is based on grouping a prescribed number of tones using a second tone grouping element (Ng) among the plurality of tones,
   wherein a first Ng, used for a first type WLAN system using a first subcarrier spacing, has a value within a first group of values,
   wherein the second Ng is configured by one selected from a second group of values,
   wherein the first subcarrier spacing is four times larger than the second subcarrier spacing, and
   wherein a minimum value of the second group of values is four times larger than a minimum value of the first group of values.

2. The method of claim 1,
   wherein the first type WLAN system is a system supporting a IEEE 802.11ac scheme, and
   wherein the second type WLAN system is a system supporting a IEEE 802.11ax scheme.

3. The method of claim 1, wherein the second Ng is configured by one selected from 4, 8 and 16.

4. The method of claim 1, wherein transmitting the specific signal transmitted by the AP comprises:
   transmitting an NDP-A (non data packet announcement) frame to the one or more STAs by the AP; and
   transmitting an NDP frame containing the specific signal to the one or more STAs by the AP.

5. The method of claim 4, wherein the AP informs the one or more STAs of a value to be used by the one or more STAs for the second Ng via the NDP-A frame.

6. The method of claim 1, wherein the beamforming feedback is received in a unit of 26 tones corresponding to an RU (resource unit).

7. The method of claim 6, wherein the 26 tones correspond to a minimum resource unit of OFDMA.

8. The method of claim 1, wherein the second Ng is configured by a different value according to a size of a resource region in which the beamforming is performed.

9. A method of transmitting a beamforming feedback by a station (STA) in a second type wireless local area network (WLAN) system using a second subcarrier spacing, the method comprising:
   receiving a specific signal from an access point (AP) via a plurality of tones; and
   transmitting the beamforming feedback to the AP,
   wherein the beamforming feedback is based on grouping a prescribed number of tones using a second tone grouping element (Ng),
   wherein a first Ng, used for a first type WLAN system using a first subcarrier spacing, has a value within a first group of values,
   wherein the second Ng is configured by one selected from a second group of values,
   wherein the first subcarrier spacing is four times larger than the second subcarrier spacing, and
   wherein a minimum value of the second group of values is four times larger than a minimum value of the first group of values.

10. The method of claim 9,
   wherein the first type WLAN system is a system supporting a IEEE 802.11ac scheme, and
   wherein the second type WLAN system is a system supporting a IEEE 802.11ax scheme.

11. The method of claim 9, wherein the beamforming feedback is transmitted in a unit of 26 tones corresponding to an RU (resource unit).

12. An access point (AP) performing sounding with one or more STAs for a beamforming scheme in a second type wireless local area network (WLAN) system, the AP comprising:
- a transceiver configured to transmit a specific signal to the one or more STAs via a plurality of tones and receive a beamforming feedback from the one or more STAs; and
- a processor configured to process the beamforming feedback received by the transceiver,
- wherein the beamforming feedback is based on grouping a prescribed number of tones using a second tone grouping element (Ng) among the plurality of tones,
- wherein a first Ng, used for a first type WLAN system using a first subcarrier spacing, has a value within a first group of values,
- wherein the second Ng is configured by one selected from a second group of values,
- wherein the first subcarrier spacing is four times larger than the second subcarrier spacing, and
- wherein a minimum value of the second group of values is four times larger than a minimum value of the first group of values.

13. The AP of claim 12,
- wherein the first type WLAN system is a system supporting a IEEE 802.11ac scheme, and
- wherein the second type WLAN system is a system supporting a IEEE 802.11ax scheme.

14. A station (STA) transmitting a beamforming feedback in a second type wireless local area network (WLAN) system using a second subcarrier spacing, the STA comprising:
- a transceiver configured to receive a specific signal from an access point (AP) via a plurality of tones and transmit the beamforming feedback to the AP; and
- a processor configured to generate the beamforming feedback based on measurement of the specific signal in a manner of grouping a prescribed number of tones using a second tone grouping element (Ng),
- wherein the processor selects the second Ng as one from a second group of values,
- wherein the first subcarrier spacing is four times larger than the second subcarrier spacing, and
- wherein a minimum value of the second group of values is four times larger than a minimum value of the first group of values.

15. The STA of claim 14,
- wherein the first type WLAN system is a system supporting a IEEE 802.11ac scheme, and
- wherein the second type WLAN system is a system supporting a IEEE 802.11ax scheme.

* * * * *